United States Patent [19]

Myers

[11] 4,090,896
[45] May 23, 1978

[54] MAKING INSULATED CONDUCTORS

[75] Inventor: Daryl Lester Myers, Lawrenceville, Ga.

[73] Assignee: Western Electric Company, Inc., New York, N.Y.

[21] Appl. No.: 693,605

[22] Filed: Jun. 7, 1976

Related U.S. Application Data

[63] Continuation of Ser. No. 538,822, Jan. 6, 1975, abandoned.

[51] Int. Cl.² .............................................. H01B 13/14
[52] U.S. Cl. ........................................ 156/51; 156/498
[58] Field of Search ................... 156/47, 51, 52, 55, 156/56, 244, 498, 500; 118/68, 69, 118, 123, 124; 427/117, 359, 398 R, 398 A, 398 B; 264/272; 425/113; 226/108

[56] References Cited

U.S. PATENT DOCUMENTS

| | | | |
|---|---|---|---|
| 1,666,038 | 4/1928 | Alderfer | 156/500 |
| 2,002,995 | 5/1935 | Hartmann et al. | 226/108 |
| 2,155,324 | 4/1939 | Moritz | 264/195 |
| 3,890,179 | 6/1975 | Deardurff | 156/53 |

Primary Examiner—William A. Powell
Assistant Examiner—William H. Thrower
Attorney, Agent, or Firm—E. W. Somers

[57] ABSTRACT

A conductive element is covered with an insulating material which is cooled within a predetermined temperature range, and preferably near or at ambient, by moving the conductor first through a cooling trough and then in a plurality of convolutions about spaced grooveless rollers which comprise a capstan. The length of the cooling trough is such that the insulation is not deformed as it engages the capstan and the number of convolutions wrapped about the capstan which is subjected to a cooling medium are determined to insure that the temperature of the conductor exiting from the capstan is at or near ambient. Unlike conventional grooved capstans, the capability of the grooveless capstan to provide for a variable number of convolutions compensates for temperature differences caused by different conductor designs and/or manufacturing parameters such as line speed and thereby insures that coaxial capacitance measurements taken at the exit end of the capstan are made with the conductor temperature being substantially constant.

3 Claims, 4 Drawing Figures

MAKING INSULATED CONDUCTORS

This is a continuation of application Ser. No. 538,822 filed Jan. 6, 1975, now abandoned.

BACKGROUND OF THE INVENTION

1. Field of the Invention

This invention relates to making insulated conductors and, more particularly, methods of and apparatus for cooling an insulated conductor advanced along a substantially linear portion of a manufacturing line and then about a grooveless capstan at a downstream end of the substantially linear portion in a number of convolutions which may be varied to maintain the conductor exiting from the capstan at a desired temperature.

2. Technical Considerations in the Prior Art

In today's manufacture of communications transmission conductors, there is a trend toward using higher and higher line speeds, e.g., five thousand feet per minute or higher. This causes a demand for substantially increased cooling capacity because of the reduced time during which the conductor is exposed to a cooling medium. Obviously, those wishing to raise line speeds in existing manufacturing facilities to remain competetive may encounter substantial difficulties in attempting to increase the line length because of other equipment adjacent thereto as well as the costs involved in extensive modifications.

In addition to the requirement for increased cooling capacity, another problem relating to cooling presents itself with respect to capacitance monitoring of the insulation of the conductors. This is generally performed intermediate a downstream end of a substantially linear water trough, used in many insulating lines, and a capstan. Conventionally, the capstan includes a pair of spaced-grooved rollers, each of the rollers having generally five to nine grooves formed thereon.

Problems arise because coaxial capacitance measurements are affected by temperature and the temperature of the insulated conductor entering the grooved capstan may not be constant. Temperatures are a function of, for example, conductor gauge size, cooling capacity, and line speed. For example, when using the larger gauge size wires such as a 22 gauge conductor, the temperature of the insulation would be above that of the insulation of a 26 gauge wire which is advanced from the cooling trough into engagement with the capstan. As a result, the capacitance monitors in the shop must be recalibrated in accordance with the expected temperatures of the particular conductors advanced through the monitoring units. If this time consuming and expensive recalibration is not done, then false readings are indicated for the coaxial capacitance monitoring and are not discoverable until the conductors are assembled into a cable and mutual capacitance or capacitance-to-ground unbalance failures occur.

In today's more sophisticated communications systems, stringent requirements exist for the mutual capacitance between associated pairs of the conductors. In solid type insulation, capacitance can be generally, but not as reliably, controlled by controlling diameter-over-dielectric (DOD). But with cellular or dual insulation, control must be exercised over both capacitance and DOD.

In order to meet these requirements it is incumbent upon a manufacturer to be able to monitor the coaxial capacitance with accuracy and consistency. This is impossible with the presently used cooling arrangements unless the expensive recalibration procedures discussed hereinbefore are used.

Although the capacitance monitor could be placed after the grooved capstan, the temperature of the conductor may not be constant because of the limited capacity of commercially available grooved capstans. This may not be adequate to reduce the temperature of the conductor sufficiently to attain a desired temperature at which the capacitance is always measured.

It is desirable to measure the coaxial capacitance when the conductor is at a specified temperature to avoid the necessity for expensive recalibration procedures. To accomplish this requires an adjustment of cooling capacity depending on line speed changes, insulation material and thickness gauge size and wire preheat. The cooling capacity is comprised of the substantially linear water trough and the grooved capstan subjected to water jets or sprays, for example.

It is well known that the linear portion of the cooling trough need only be as long as is required to prevent deformation of the conductor insulation when the conductor is advanced into engagement with the capstan. This is generally sized in accordance with the requirements for a large gauge conductor or a conductor design having difficult cooling characteristics, e.g., conductors requiring a hot water cooling trough section. Any lengthening of the linear portion over that required to prevent deformation in order to increase cooling capacity is undesirable because of an undue amount of tension imparted to the insulated conductor, particularly to fine gauge, e.g., 26 gauge conductors.

Cooling capacity may also be increased by providing a capstan having a very large number of grooves for each of the rollers comprising the capstan. Then, in the event a smaller gauge conductor is run through the line, the conductor need only be wrapped along a portion of those grooves and thence through the exit end of the capstan because of the reduced amount of cooling required. This approach is undesirable because the conductor would have to be run transversely across the tops of the walls of the grooves comprising the capstan in order to avoid being threaded through all of the grooves. This may cause damage to the insulation. In the alternative, a sheave guide assembly could be used to direct the conductor from an intermediate groove. This complicates an already congested structure, may be difficult to maintain freely rotatable and still leaves an undesirable amount of string-up when using all the grooves.

Grooveless capstans have been used in the textile industry for a variety of reasons. Stringing up a fibrous material particularly of the finer denier sizes in a grooved roller or capstan is extremely time consuming. Also, the walls of the grooves may have a deleterious effect on the filamentary and fibrous material.

Grooveless capstans comprising spaced rollers, one being canted to the other have also been used in the textile industry. These are canted so as to be in non-parallel planes transverse of the axis of advance. This results in a plurality of convolutions of increasing or decreasing size which principle is used to compensate for the shrinkage or stretching in the fibers. A tapered capstan has also been used for this purpose. See, for example, U.S. Pat. Nos. 2,155,324, 2,757,101 and 2,746,281.

SUMMARY OF THE INVENTION

A method of making an insulated conductor embodying the principles of this invention such that the conductor is suitable for use in a communication transmission system includes the steps of extruding at least one insulative covering about a conductive element to form an insulated conductor, and moving the insulated conductor through a cooling medium in a path which includes a substantially linear portion sufficient in length to prevent deformation of the covering upon the conductor being advanced along a convolute path. Then the insulated conductor is moved through a cooling medium in a convolute path in number of convolutions to cooperate with the linear portion to insure that the temperature of an insulated conductor moved out of the convolute path is at a substantially desired constant temperature to facilitate the monitoring of the capacitance at a constant temperature.

An apparatus for carrying out the principles of the methods of this invention for making an insulated conductor suitable for use in communications transmissions systems includes facilities for advancing a conductive element, facilities for extruding at least one insulative covering about the conductive element to form an insulated conductor, facilities for guiding the insulated conductor through a cooling medium in a substantially linear path sufficiently long to prevent deformation of the covering upon the conductor when it advanced along a convolute path. The apparatus also includes means for guiding the insulated conductor through a cooling medium in a convolute path capable of being varied in number of convolutions to cooperate with the movement of the conductor through the cooling medium in the linear path to insure that the temperature of a conductor advanced out of the convolute path is at a substantially desired constant temperature.

The apparatus further includes a capacitance monitor which is positioned adjacent the downstream end of the convolute portion of the path such that the capacitance is monitored substantially at the desired temperature which preferably is ambient.

BRIEF DESCRIPTION OF THE DRAWINGS

These and other features of the present invention will be more readily understood from the following detailed description of specific embodiments thereof when read in conjunction with the accompanying drawings, in which.

DETAILED DESCRIPTION OF THE INVENTION

The methods and apparatus of this invention may be used to cool effectively and efficiently elongated materials with the capability of varying the cooling required as between different types and or sizes of elongated materials to attain a desired temperature, preferably ambient, at a predetermined location. In a preferred embodiment, the methods and apparatus of this invention are especially suitable for use in cooling insulated conductors including those used in communications transmissions systems.

Moreover, the methods and apparatus of this invention facilitate the measurement of coaxial capacitance at substantially constant temperature levels.

OVERALL APPARATUS

Figures 1, 2:
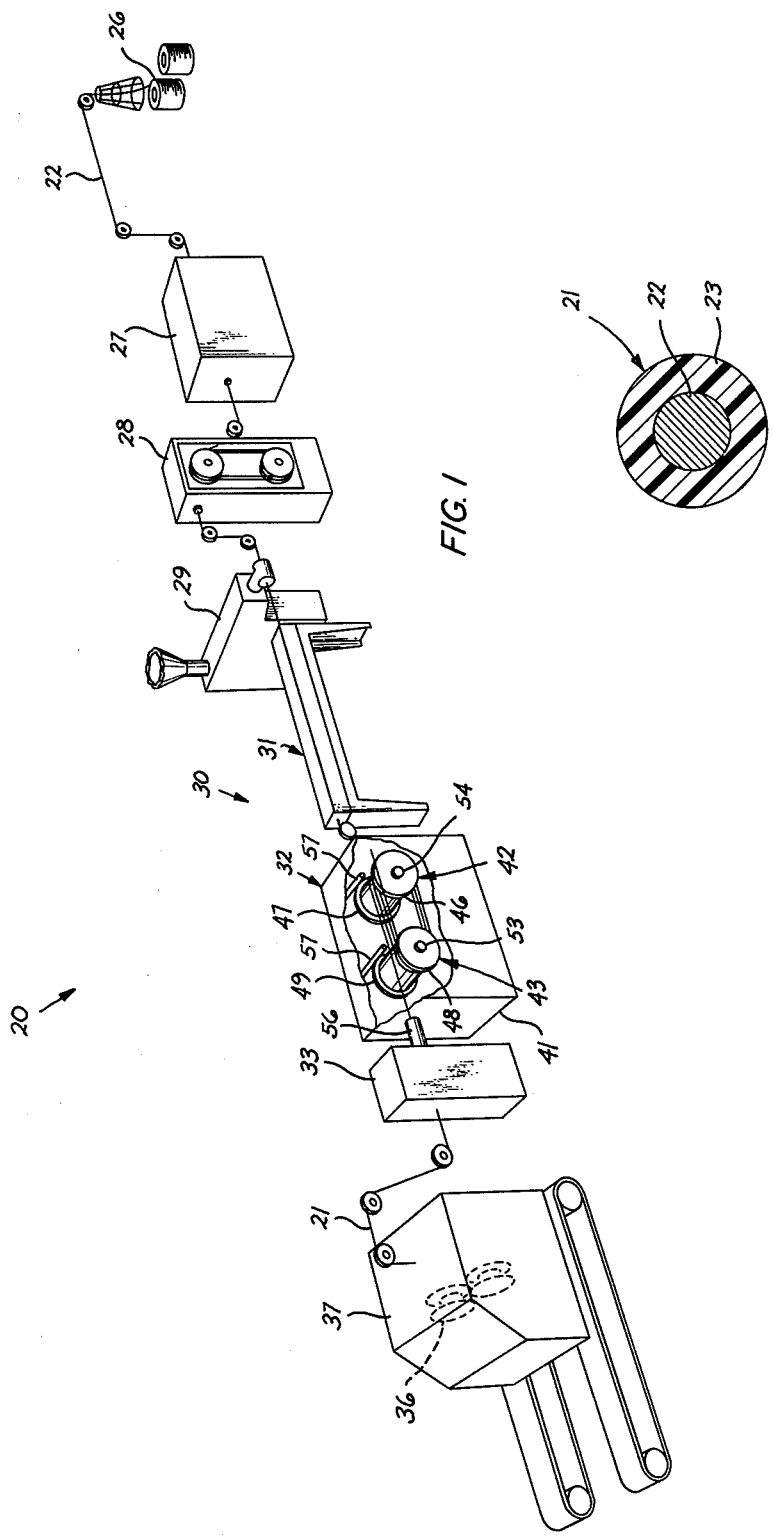
FIG. 1 is a view in perspective of a manufacturing line for making an insulated conductor suitable for use in a communication transmission system and showing cooling facilities especially adapted to maintain the temperature of the insulation substantially constant at a downstream end thereof regardless of gauge size, insulation material or line speed, for example.
FIG. 2 is an enlarged cross sectional view of an insulated conductor to be manufactured in accordance with the principles of this invention.
Figure 3:
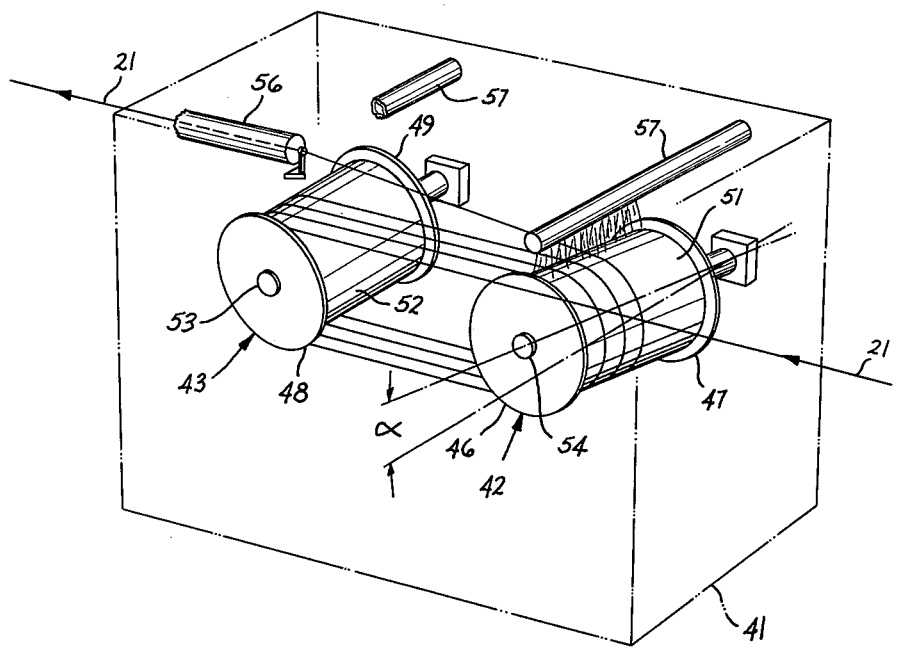
FIG. 3 is an enlarged view in perspective showing a portion of the cooling facilities which includes a grooveless capstan with one of the rollers being canted to the other.

Referring now to FIG. 1, there is shown an apparatus, designated generally by the numeral 20 for carrying out the principles of this invention to manufacture an insulated conductor 21 (see FIG. 2) which includes a conductive element 22 covered with an insulative material 23. The conductive element 22 is advanced from a supply 26 through a wire drawing apparatus 27 and then in a plurality of loops through an annealer 28, all of which are well known in the art. From the annealer 28, the conductive element 22 is advanced through an extruder 29 where it is covered with at least one layer of an insulative material which may be a cellular insulation or cellular insulation having a solid insulation outer skin, for example.

The insulated conductor 21 is then advanced into and through cooling facilities, designated generally by the numeral 30. The cooling facilities 30 includes a section 31 through which the conductor 21 is advanced along a substantially linear path and a cooling capstan 32 through which the conductor is advanced in a plurality of convolutions. The conductor 21 is exposed to a cooling medium while it is advanced along the linear and convolute paths.

At the downstream end of the capstan 32 is a capacitance monitor 33 for measuring the capacitance of the conductor exiting from the cooling facilities 30. The capacitance monitor 33 may be any of these well known in the art such as that disclosed in U.S. Pat. Nos. 2,765,441; 2,804,592; 2,897,442; 2,908,861; 3,104,472; 3,288,895 and 3,500,185, all incorporated by reference hereinto.

Then the insulated conductor 21 is taken up on one of the reels 36-36 by any one of several commercially available take-ups, designated generally by the numeral 37. Especially suitable for use in a high speed, e.g., 5000 feet per minute, manufacturing line is a take-up apparatus as disclosed and claimed in copending commonly assigned application Ser. No. 440,231 filed Feb. 6, 1974 now U.S. Pat. No. 3,877,653 which is a continuation-in-part application of Ser. No. 228,595 filed Feb. 23, 1972, now abandoned.

COOLING CONSIDERATIONS

The apparatus 20 is desirably constructed with the capability of varying the cooling capacity in order to constantly reach a desired temperature of the conductor 21 at the downstream side of the capstan 32.

The term "temperature of the conductor" in this application is interpreted to mean the temperature of the conductive element 22 as measured by techniques disclosed in U.S. Pat. No. 3,737,982 issued June 12, 1973 in the name of John C. Calhoun and William M. Flegal and incorporated by reference hereinto. This temperature is essentially the temperature at the interface of the insulation 23 and the conductive element 22.

The temperature of a conductive element having been advanced through preheating facilities and entering the extruder 29 may be on the order of 180° F with the extrusion melt temperature 370° F. However, it has been shown that the transfer of thermal energy into the conductive element 22 in a short time period following the application of the insulation from the extruder 29 causes the conductive element to reach a temperature elevated over that of the conductive element advanced into the extruder.

As a result of the operation of the cooling facilities 30, the temperature of the insulation decreases more rapidly than that of the conductive element 22, so that after a short time period following extrusion, the temperature of the conductive element is the highest temperature of the conductor 21 in a radial direction. Hence, when the temperature at the insulation-conductive element interface is reduced to be at or near ambient, the temperature of the insulation 23 near the surface thereof is below ambient.

The capability of an easily varied cooling capacity is desirable because the cooling requirements of a conductor 21 may vary as a function of several variables. Experiments have shown that the cooling rate is a function of the insulation 23. For example, a 22 gauge polyvinyl chloride (PVC) insulated conductor having a 0.043 inch diameter-over-dielectric (DOD) formed by advancing a copper conductive element having a temperature of 78° F at a line speed of 3000 feet per minute through an extruder having a 370° F extrusion melt temperature cools to approximately 75° F with 100 feet of cooling after extrusion. On the other hand, a polypropylene insulated 22 gauge copper conductor with a 0.052 inch DOD, 80° F preheat and 452° F melt temperature advanced at the same line speed cools to 75° F in approximately 150 feet. The use of polypropylene requires a larger wall thickness and higher preheat which contribute to longer cooling times.

Tests have also shown that a 22 gauge copper conductor preheated to a temperature of 80° F and extrusion-covered with a high density polyethylene having a melt temperature of 500° F to 540° F cooled to 150° F in 50 feet for a DOD of 0.055 inch; to approximately 120° F for a ⅜ inch and to approximately 80° F with a 0.043 inch DOD. In still another experiment relating to a comparison of temperature in the conductor for different gauge sizes with melt, preheat, and cooling medium temperatures held constant, a 19 gauge conductor had cooled to approximately 120° F in 2 seconds while a 26 gauge conductor had cooled to approximately 80° F.

Preheat temperature of the conductive element 22 also effects the cooling capacity required. For constant melt and cooling medium temperature, a conductive element 22 at 250° F preheat cooled to approximately 195° F in 1 second while that at a preheat of 150° F cooled to approximately 160° F. Melt temperature also effects directly the cooling capacity required.

The cooling capacity required is also a function of the temperature of the cooling medium. While it may appear that one solution to increasing the cooling capacity would be to decrease the temperature of the cooling medium, this is not always possible. Some plastic insulating materials such as polypropylene and high density polyethylene must initially be exposed to a higher temperature cooling medium in order to avoid the formation of contraction voids. In using these materials, generally the first or upstream section of the cooling trough 31 is provided with a higher temperature medium than the remaining sections of the trough.

A manufacturing line in the wire and cable industry is rarely dedicated to only one product. It would be most advantageous to provide cooling facilities which may be easily varied in order to provide the cooling capacity required to cool the conductor 21 to a predetermined temperature, such as, for example, ambient, notwithstanding changes in the line parameters discussed hereinbefore. The attainment of a substantially constant, sufficiently cool, temperature downstream of the capstan 31 avoids, for example, the occurrence of loose wraps on takeup packages which causes problems in subsequent operations. Moreover, a variable cooling capacity for achieving a substantially constant temperature downstream of the capstan 31 is also desirable in order to provide constant conditions for capacitance measurement.

CAPACITANCE MONITORING

It will be appreciated that capacitance measurements are affected by temperature. Since the length of the linear portion 31 is fixed and since different gauge conductors 21-21 may be used in manufacture on the same apparatus 20, the temperature of the insulation as between different gauge sizes will vary. This necessitates that frequent recalibrations be performed on the monitor 33. Positioning the capacitance monitor 33 downstream of the capstan 32 does not overcome this problem. Since the prior art grooved capstans are limited practically to approximately seven grooves, the temperature of the insulation 23 at the downstream end of the capstan 32 still continues to vary as between different gauge sizes.

The cooling facilities 30 of this invention overcomes these problems by providing the capability of cooling the insulated conductor 21 such that the temperature thereof at the capstan exit is substantially ambient. This is accomplished by providing the capstan 32 with the capability of accommodating a large range or number of convolutions of strand material, e.g., conductor 21 such that the cooling imparted to the conductor by the fixed length trough 31 coupled with the variable capacity capstan is adequate to achieve ambient temperature.

COOLING FACILITIES

The cooling facilities 30 includes the linear section 31, which may be a standard water trough, and, which, as is well known in the art, may or may not be countercurrent flow. In the alternative, the linear portion 31 may include at least one apparatus of the type disclosed in U.S. Pat. Nos. 3,740,862 and 3,800,435 issued in the name of H. L. Woellner on June 26, 1973 and Apr. 5, 1974, respectively, and wherein air is caused to mix with jet streams of a cooling medium to cool a conductor in a surprisingly short length of tubing.

The length of the linear section is determined such that the insulation 23 of the largest expected gauge size to be run thereon will not be deformed or affected adversely as the insulated conductor 21 is advanced out of the linear section 31 and into engagement with the capstan 32.

The capstan 32 includes a housing 41 enclosing a pair of spaced grooveless rollers 42 and 43, the roller 42 being adjacent the upstream end of the capstan and the roller 43 being adjacent the downstream side. The roller 42 is provided with flanges 46 and 47 while the roller 43 is provided with flanges 48 and 49. The rollers 42 and 43 include surfaces 51 and 52, respectively, which are generally cylindrical and are essentially uninterrupted. Being smooth, they are easily maintained by shop personnel as opposed to having to accurately machine grooves in the priorly used grooved capstans.

Figure 4:
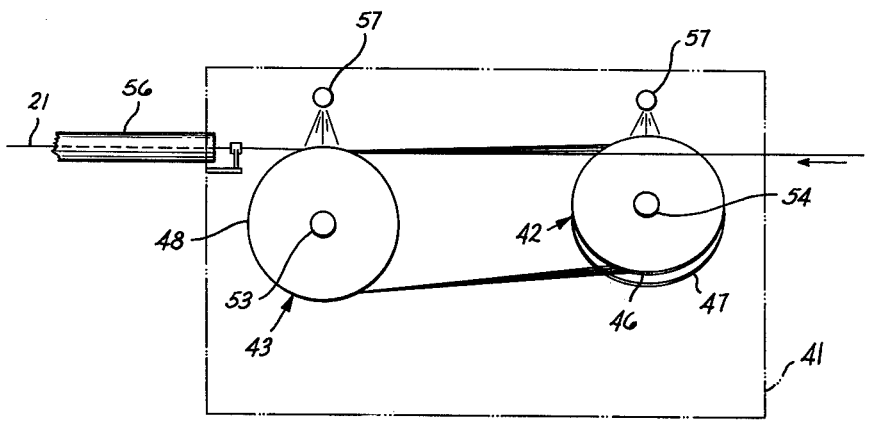
FIG. 4 is a view in front elevation showing the capstan of FIG. 3.

Further, the roller 43 is mounted rotatably on a shaft 53 attached to the housing 41 such that an axis thereof is generally normal to the line of advance of the conductor 21 through the apparatus 20. Moreover, the axis of the shaft 53 lies generally in a horizontal plane. (see FIG. 4).

The roller 42 is specially mounted rotatably on a shaft 54 which is attached to the housing 41 and lies in a vertical plane which also is generally normal to the line of advance of the conductor 21. However, unlike the roller 43, the axis of the roller 42 is inclined at an angle $\alpha$ to the horizontal. Moreover, the roller 42 is mounted so that the angle $\alpha$ of inclination may be varied.

The housing 41 is provided with a guide tube 56 on the downstream side thereof. After the conductor 21 has been advanced along the last convolution about the rollers 42 and 43, it is moved through the tube 56, which may be constructed of a henium material, and out of the housing 41.

The use of a tilted roller 42 or bank or sheaves tilted to a companion set of sheaves is shown in the prior art. See, for example, U.S. Pat. Nos. 1,938,190 and 3,439,483. For example, in a conventional grooved capstan, the conductor 21 is moved into the capstan into engagement with a first groove of a downstream one of a pair of grooved rollers (not shown) which is horizontally disposed, then in an upstream direction into engagement with the first groove of the upstream grooved roller. The upstream one of the grooved rollers is inclined out of the horizontal plane to align the top portion of a first groove thereof with a second groove of the downstream roller (not shown). Then the conductor 21 is moved downstream out of engagement with the first groove of the upstream roller and because of the tilt is caused to engage the second groove of the downstream roller. This string-up continues until the innermost convolution engages the upstream roller and then is moved downstream through the guide tube 56 and out of the capstan 32.

It should be apparent from this description of the string-up why a capstan having significantly more grooves than are presently available is not used. Assume a capstan is provided having sufficient number of grooves to accommodate the conductor 21 requiring the greatest cooling. Then, when a conductor 21 requiring a lesser amount of cooling is run on the apparatus 20, less than all of the grooves are used. However, if less than all of the grooves were used, the conductor 21 would have to be moved transversely of the tops of some of the groove walls to be routed to the guide tube 56. This, of course, could cause damage to the conductor insulation 23. Consequently, in practice, either a multi-grooved capstan is provided with all grooves used and requiring tedious string-up or a capstan having a small number of grooves is used with less than adequate cooling unless compensated for by an unduly long trough with loss of valuable floor space.

The foregoing problem can be avoided by using a guide assembly (not shown) to guide the conductor 21 from any one of the grooves in a large number grooved capstan through the guide tube 56. This avoids the conductor 21 being routed undesirably over the tops of the walls of the grooves. However, this adds complicating structure to the capstan 32 within a very limited space and may, because of the water bath in the capstan, be difficult to maintain freely rotatable.

The principle of the canted roller 42 may be used to advantage in carrying out the methods of this invention. The tilting of the grooveless roller 42 causes a spacing between successive ones of the convolutions of the conductor 21 in engagement with the surfaces of the rollers.

The spacing between successive ones of the wraps or convolutions, referred to as the "lead" is a function of the diameter of the roller 42 and the angle, $\alpha$, of tilt. Disregarding the negligible effects of frictional forces, any lack of parallelism between the shafts 53 and 54, and machining or wear conditions, the "lead" is determined by the roller diameter multiplied by the tangent of the shaft's angular elevation, $\alpha$, from the horizontal. It should be clear that the reduction of $\alpha$ permits an increased number of wraps of the conductor 21 and provides a range sufficiently capable of cooling any conductor anticipated for manufacture by the apparatus 20. Of course, a reduction in $\alpha$ may require a lateral or horizontal shift of the roller 42 to compensate for the reduction in conductor convolution spacing.

The angle $\alpha$ typically has an order of magnitude of 1 to $2\frac{1}{2}°$ for a roller having a 16 inch diameter. If the angle $\alpha$ becomes too small, then, undesirably, the adjacent ones of the convolutions may touch. If the angle $\alpha$ is too large, the convolutions may slip along the surfaces 51 and 52. Moreover, it is desirable that all the wraps or convolutions of the conductor 21 be essentially equal in length. If the angle $\alpha$ becomes too large, then, notwithstanding the axes of the rollers 42 and 43 being in parallel vertical planes, the lengths of the convolutions will not be equal and undesirable stretching of the conductor 21 may occur.

The angle $\alpha$ may vary from those typical values specified above. Since the "lead" is a function of roller diameter and the angle $\alpha$, the larger the diameter of the roller 42, the smaller is the angle $\alpha$ to maintain the same "lead".

The capstan 32 is also provided with facilities for exposing the conductor 21 being advanced in a convolute path to a cooling medium. Prior art grooved capstans conventionally are provided with a plurality of jets (not shown) to direct jet sprays toward the grooves. This is necessary in order to insure adequate cooling of the conductor wraps which are confined between the groove walls. But for the jet sprays, the cooling medium may not effectively penetrate the space between the conductor and the walls to effectively cool uniformly the insulation. With the grooveless capstan 32, this concern is obviated. The jet sprays may be eliminated and a tubed uncomplicated water wash 57 in the housing 41 (see FIG. 4) used.

The cooling medium used in the capstan 32 is typically water as supplied for normal municipal or plant use and is capable of reducing the temperature of the conductor to ambient. It has been found that if chilled water, at approximately 40° F, is used, the temperature of the conductor may be reduced below ambient.

In one example, a standard seven groove capstan was modified to remove the grooves in such a way as to retain the outside groove walls to serve as flanges. A 22 gauge low density polyethylene insulated conductor 21 having a DOD of 43.7 mils was advanced through the apparatus 20. Without changing the angle α of the capstan 32, a uniform conductor spacing having nine wraps was obtained. From this, it may be concluded that the walls of the original seven grooves were forcing the conductor 21 into the grooves rather than having the grooves matched to the conductor path. This illustrates another advantage of the grooveless capstan 32 in that abrasive forces on the conductor 21 are eliminated during the cooling stage. This advantageously provides excellence in insulation quality and capacitance.

Typically, the rollers 42 and 43 are constructed from a steel material having a rust-resistant coating or from an aluminum material and are in the range of 16 to 30 inches diameter. The length of each of the rollers 42 and 43 is determined so that there is a spacing between consecutive adjacent ones of the convolutions. It has been found that a seven groove capstan modified to remove the groove walls can accomodate from between 15 to 17 wraps.

The use of the grooveless capstan 32 having an adjustable cooling capacity permits the linear portion 31 of the cooling facilities 30 to be only as long as is necessary to avoid deformation of the insulation of the conductor 21 which is advanced into the convolute path. The capability of shortening the trough 31 advantageously reduces the tension in the conductor 21.

EXAMPLES

Reference is made to Table I which includes the results of a series of cooling experiments with a 22 AWG conductor insulated with solid low density polyethylene and having a DOD of 43.7 mils and a 70 pf/foot capacitance. The insulation 22 was applied with a 2½ inches, 24 to 1 extruder with a 0.043 inch die. The cooling trough 31 is comprised of ten foot V-shaped sections with the water flowing in the direction of wire travel. The conductor 21 was strung up in twenty wraps, which equates to about 150 feet, about the spaced rollers 42 and 43.

Two capacitance monitors were used, one positioned on the downstream side and one on the upstream side of the capstan 32. Both monitors were calibrated statically using conductor samples of known capacitance and determined by an off-line "umpire" or reference monitor.

Table I shows the capacitance readings taken on the upstream and downstream sides of the capstan 32 with variation in line parameters. As can be seen from Table I, the capacitance readings taken downstream were essentially the same as those of the "umpire" notwithstanding changes in the line parameters. Conductor temperature measurements may be made in accordance with techniques disclosed in priorly identified U.S. Pat. No. 3,737,982.

TABLE I

| Variable | Line Speed | Cond. Temp. | Melt Temp. | Water Trough Length | Cap. Before Capstan pf/ft | Cap. After Capstan pf/ft | Cap. Umpire pf/ft |
|---|---|---|---|---|---|---|---|
| Water Trough Length ft | 5000 fpm | 180° F | 505° F | 54 ft | 67.4±.4 | 70±.4 | 70.2 |
| | 5000 | 180 | 505 | 45 | 66.5±.5 | 70±.4 | 70.0 |
| | 5000 | 180 | 505 | 35 | 65.1±.4 | 70±.4 | 69.9 |
| | 5000 | 180 | 505 | 70 | 67.5±.4 | 70±.4 | 70.1 |
| | 5000 | 180 | 505 | 45 | 66.5±.4 | 70±.4 | 70.4 |
| | 5000 | 180 | 505 | 35 | 65.3±.3 | 70±.4 | 70.6 |
| | 5000 | 180 | 505 | 26 | 63.5±.4 | 70±.4 | 70.5 |
| | 5000 | 180 | 505 | 54 | 67.8±.4 | 70±.4 | 69.9 |
| Cond. Temp. ° F | 5000 | 280 | 505 | 54 | 66.0±.4 | 70±.4 | |
| | 5000 | 100 | 505 | 54 | 68.7±.3 | 70±.4 | |
| | 5000 | 180 | 505 | 54 | 67.6±.5 | 70±.4 | |
| Line Speed (Long Trough) fpm | 4000 | 180 | 505 | 54 | 68.2±.4 | 70±.3 | |
| | 3000 | 180 | 505 | 54 | 69.4±.3 | 70±.3 | |
| | 2000 | 180 | 505 | 54 | 70 ±.2 | 70±.2 | |
| Line Speed (Short Trough) fpm | 2000 | 180 | 505 | 26 | 68.7±.2 | 70±.2 | |
| | 3000 | 180 | 505 | 26 | 66.8±.3 | 70±.2 | |
| | 4000 | 180 | 505 | 26 | 65.2±.4 | 70±.4 | |
| | 5000 | 180 | 505 | 26 | 63.4±.4 | 70±.4 | |
| Melt Temp. ° F | 5000 | 180 | 520 | 26 | 63.0±.4 | 70±.4 | |
| | 5000 | 180 | 506 | 26 | 63.2±.4 | 70±.4 | |
| Cond. Temp. ° F | 5000 | 250 | 506 | 26 | 61.8±.4 | 70±.4 | |
| | 5000 | 110 | 506 | 26 | 65.2±.4 | 70±.4 | |
| | 5000 | 180 | 506 | 26 | 63.2±.4 | 70±.4 | |

With the particular conductor design manufactured for purposes of Table I, a capacitance of 70 pf/ft is desired. In order to obtain this, readings were taken by the off-line reference monitor (not shown) and the screw speed of the extruder 29 adjusted until the desired capacitance reading was obtained. The extrusion conditions used in obtaining the data shown in Table I yielded extrusion melt temperatures which were higher than normal because of a high line speed relative to extruder sizes.

As can be seen in Table I, the capacitance readings taken downstream of the capstan 32 were within the range of the desired capacitance reading. Moreover, as can be seen for example, in the variation of water trough length, the after-capstan capacitance readings were in agreement with those taken by an off-line reference monitor.

While the capstan 32 in the preferred embodiment includes the two grooveless rollers 42 and 43 which are generally horizontally disposed, other arrangements embodying the principles of this invention may be used. In all arrangements, the axes of the rollers 42 and 43 lie in parallel planes which are generally normal to the wraps or convolutions of the conductor 21.

In one alternate arrangement and assuming a horizontally disposed water trough 31, the roller 43 may be vertically disposed with respect to and beneath the roller 42 with the parallel planes containing the axes being horizontal. The axis of the roller 42 is inclined slightly in its associated plane with respect to the axis of the roller 43. In a still further arrangement, the roller 43 may be below and downstream of the roller 42 so that the parallel planes containing the axes are inclined to the horizontal.

It should also be understood that while it is conventional for the conductor 21 entering the capstan 32 to engage the downstream roller 43 and then be advanced in an upstream direction into engagement with the roller 42, the conductor could be wrapped first about the roller 42, then be advanced downstream to the roller 43.

It is to be understood that the above-described arrangements are simply illustrative of the principles of the invention. Other arrangements may be devised by those skilled in the art which will embody the principles of the invention and fall within the spirit and scope thereof.

What is claimed is:

1. A method of making an insulated conductor suitable for use in a communications transmission system, which includes the steps of:

extruding at least one insulative covering about a conductive element to form an insulated conductor;

moving the insulated conductor through a cooling medium in a path which includes a substantially linear portion sufficient in length to prevent deformation of the covering upon the conductor being advanced subsequently along a convolute path;

moving the insulated conductor along a convolute path in spaced-apart convolutions which are strung up between two spaced cylindrical surfaces with the convolutions capable of being varied as to number so that they together with the length of the substantially linear portion are sufficient to insure that the temperature of an insulated conductor moved through the linear portion, then into and out of the convolute path is substantially constant and at a desired predetermined temperature; and measuring the coaxial capacitance of the insulated conductor after it has been moved out of the convolute path and while it is at the predetermined temperature.

2. An apparatus for making an insulated conductor suitable for use in communications transmissions systems, which includes:

means for extruding at least one insulative covering about a conductor which is advanced therethrough to form an insulated conductor suitable for use in communications transmissions systems;

means for guiding the insulated conductor in a downstream direction along a substantially linear path through a cooling medium which is sufficient in length to prevent deformation of the insulated conductor when it is advanced in a convolute path;

a first roller having a cylindrical surface spaced downstream from the guiding means and having the axis thereof in a plane which is normal of the linear path;

a second roller having a cylindrical surface spaced downstream from the first roller with the axis thereof in a plane which is normal to the linear path and parallel to the plane which contains the axis of the first roller;

means for advancing the insulated conductor through the extruding means, along the linear path, into engagement with the cylindrical surface of the second roller, then into engagement with the cylindrical surface of the first, and cyclically between the two in a plurality of convolutions; and means for causing a cooling medium to engage the plurality of convolutions of the insulated conductor; and adjustable means for mounting the rollers to incline the axes of the rollers in the associated parallel planes relative to each other to space apart the convolutions which are all substantially of the same length with the number of convolutions capable of being varied so that they together with the linear portion cause the insulated conductor to be exposed to the cooling medium for a time sufficient to reduce the temperature of the conductor downstream of the rollers substantially to a constant and predetermined temperature notwithstanding changes in conductor design or manufacturing parameters; and means positioned at the downstream end of the spaced rollers for measuring the coaxial capacitance of the conductor at the substantially constant temperature.

3. An apparatus for making an insulated conductor suitable for use in a communications transmission system, which includes:

means for advancing a conductor;

means for extruding an insulative cover about the conductor to form an insulated conductor;

means for guiding the insulated conductor through a cooling medium along a substantially linear path which is sufficient in length to prevent deformation of the insulated conductor when it is advanced in a convolute path;

a grooveless capstan which includes a pair of spaced-apart rollers each having a substantially cylindrical surface about which the conductor is advanced in a plurality of convolutions;

means for further cooling the conductor as it is advanced in the plurality of convolutions about the pair of rollers;

adjustable means for mounting the rollers with the axes of the rollers lying in parallel planes which are normal to the linear path and which in the associated planes are inclined relative to each other to be able to vary the spacing between adjacent ones of the convolutions to facilitate a string-up of a predetermined variable number of convolutions which together with the conductor in the linear path cause the insulated conductor to be exposed to the cooling medium a for time sufficient to reduce the temperature of the insulated conductor exiting from the capstan so that it is substantially at a constant predetermined temperature; and means for measuring coaxial capacitance of the insulated conductor which exits from the capstan.

* * * * *